United States Patent [19]
Jeong

[11] Patent Number: 5,654,706
[45] Date of Patent: *Aug. 5, 1997

[54] SYSTEM FOR VARIABLE LENGTH DECODING DIGITAL TRANSMISSION DATA WHICH HAS BEEN COMPRESSED BY SELECTING A SCANNING PATTERN

[75] Inventor: Jechang Jeong, Seoul, Rep. of Korea

[73] Assignee: Samsung Electronics Co., Ltd., Kyungki-do, Rep. of Korea

[*] Notice: The term of this patent shall not extend beyond the expiration date of Pat. No. 5,602,549.

[21] Appl. No.: 768,468

[22] Filed: Dec. 18, 1996

Related U.S. Application Data

[63] Continuation of Ser. No. 532,987, Sep. 22, 1995, Pat. No. 5,602,549, which is a continuation of Ser. No. 95,468, Jul. 23, 1993, Pat. No. 5,497,153.

[30] Foreign Application Priority Data

Jul. 23, 1992 [KR] Rep. of Korea .................. 92-13171

[51] Int. Cl.$^6$ ..................................................... H03M 7/40
[52] U.S. Cl. ...................................................... 341/67; 348/408
[58] Field of Search ...................................... 341/67; 348/404

[56] References Cited

U.S. PATENT DOCUMENTS

| | | | |
|---|---|---|---|
| 4,754,336 | 6/1988 | Nishizawa | 348/415 |
| 4,821,119 | 4/1989 | Gharavi | 348/402 |
| 4,908,862 | 3/1990 | Kaneko et al. | 348/409 |
| 4,972,260 | 11/1990 | Fujikawa . | |
| 5,021,891 | 6/1991 | Lee . | |
| 5,134,396 | 7/1992 | Sirat et al. | 341/51 |
| 5,227,878 | 7/1993 | Puri et al. | 348/416 |
| 5,367,629 | 11/1994 | Chu et al. | 348/403 |
| 5,424,778 | 6/1995 | Sugiyama | 348/403 |

FOREIGN PATENT DOCUMENTS

| | | |
|---|---|---|
| 0301712 | 2/1989 | European Pat. Off. . |
| 62-145988 | 6/1987 | Japan . |
| 3 266564 | 11/1991 | Japan . |

OTHER PUBLICATIONS

Mutsima Ohta, et al., "A Comparison of Various Entropy Coding Methods for MCT/DCT Hybrid Coding", Mar. 19, 1987, pp. 17–24.

*Primary Examiner*—Howard L. Williams
*Attorney, Agent, or Firm*—Sughrue, Mion, Zinn, Macpeak & Seas

[57] ABSTRACT

A system for variable-length-coding and variable-length-decoding digital data divided into a block unit of a predetermined size which includes variable-length-coding each block data according to various scanning patterns, accumulating the various lengths of variable-length-coded data, selecting a scanning pattern corresponding to a minimum accumulated length, transmitting the variable-length-coded data according to the selected scanning pattern and scanning the transmitted data according to the same scanning pattern as applied to variable-length-coding process, thereby the scanned data being variable-length-decoded. As a result, data compression can be improved efficiently by means of utilizing an optimized scanning pattern for variable-length-coding and variable-length-decoding of the block data.

45 Claims, 4 Drawing Sheets

8×8 BLOCK DATA

8×8 QUANTIZATION COEFFICIENTS

[RUN·LEVEL] CODING WITH ZIGZAG SCANNING PATTERN

FIG. 6
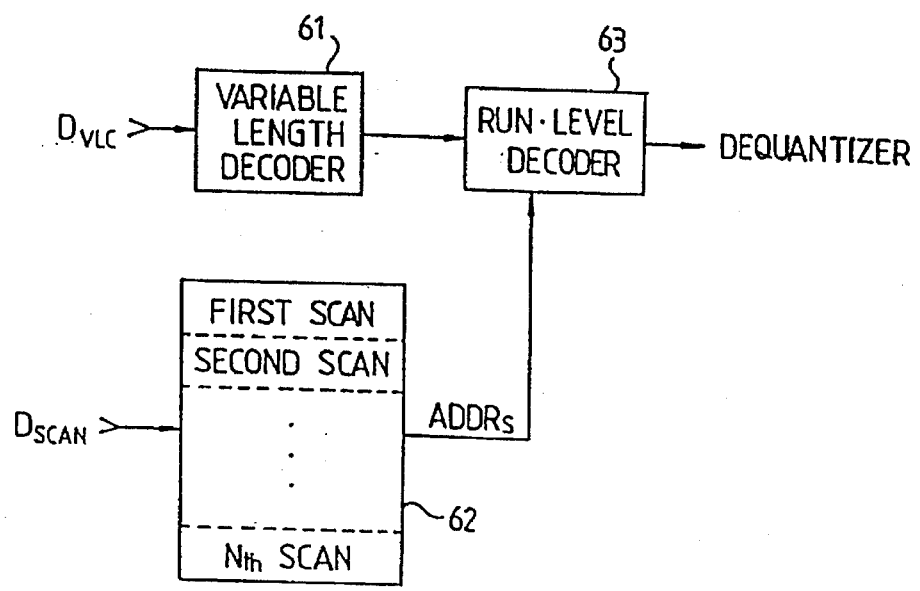
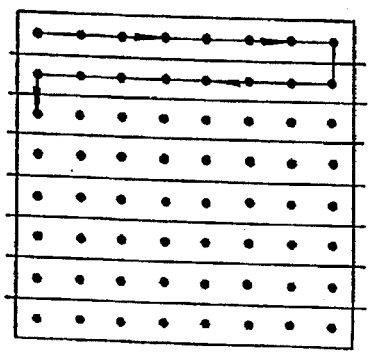
FIG. 7A
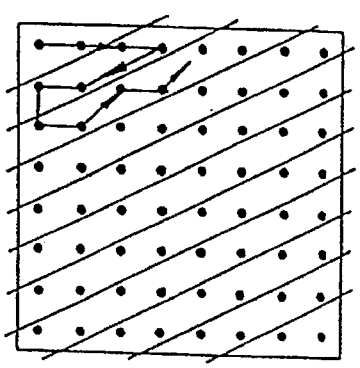
FIG. 7B
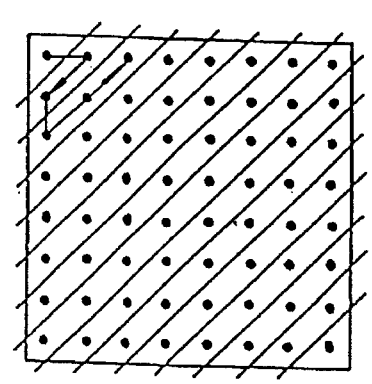
FIG. 7C

SYSTEM FOR VARIABLE LENGTH DECODING DIGITAL TRANSMISSION DATA WHICH HAS BEEN COMPRESSED BY SELECTING A SCANNING PATTERN

This is a continuation of application Ser. No. 08/532,987 filed Sep. 22, 1995, now U.S. Pat. No. 5,602,549 which is a Continuation Application of prior application Ser. No. 08/095,468, Jul. 15, 1993, now U.S. Pat. No. 5,497,153.

FIELD OF THE INVENTION

The present invention relates to a system for coding and decoding digital data, and more particularly to a coding and decoding system for variable-length-coding the digital data of a predetermined size with an optimized scanning pattern among various scanning patterns and decoding the variable-length-coded data, thereby improving further a compression of transmission data. The present disclosure is based on the disclosure of Korean Patent Application No. 92-13171 filed Jul. 23, 1992, which disclosure is incorporated herein by reference.

BACKGROUND OF THE INVENTION

Recently, a method for coding a video and audio signal into digital data so as to be transmitted or stored in a storing unit, and decoding the coded digital data so as to be reproduced has been used in a system for transmitting and receiving a video and audio signal. However, there is needed a technique for compressing further the quantity of transmission data so as to optimize a transmission efficiency of data in such a coding and decoding system. There have been a transformation coding method, a Differential Pulse Code Modulation (DPCM) method, a vector quantization method and a variable-length-coding method, etc., as methods for coding such transmitted or stored digital data. The coding methods compress a total quantity of data, by removing redundancy data which is included in the transmitted or stored digital data.

The video data of each frame is divided into a block unit of a predetermined size and data-processed in a coding and decoding system for transmitting and receiving the video signal. Each block data or differential data between block data is orthogonal-transformed, so that the video data is transformed into transformation coefficients in the frequency domain. There have been a Discrete Cosine Transform (DCT), a Walsh-Hadamard Transform (WHT), a Discrete Fourier Transform (DFT) and a Discrete Sine Transform (DST), etc., as block data transformation methods. The transformation coefficients obtained by such transformation methods are coded properly according to the characteristic of coefficient data, so that compressed data is gained or increased. Since one's sight is more sensitive to the low frequency than the high frequency, the data in the high frequency is reduced under data-processing. Accordingly, the quantity of the coded data can be decreased.

FIG. 1 represents a schematic block diagram of a conventional coding apparatus of a video data. First, an input terminal 10 is input with N×N blocks (which is generally represented as $N_1 \times N_2$, and which for the convenience of explanation, is assumed as $N_1=N_2=N$). The block data input through the input terminal 10 is added to a predetermined feedback data in a first adder A1, thereby calculating differential data between the two data (i.e., between the input data and the feedback data). An orthogonal transformer 11 discrete-cosine-transforms input differential data, thereby causing the differential data to be transformed into coefficients in the frequency domain. A quantizer 12 changes coefficients transformed through a predetermined quantizing process into representative values of various levels. Then, the quantizer 12 variably quantizes the output data from the orthogonal transformer 11 according to a quantization level (Q) input from a buffer 14. A variable length coder 13 variable-length-codes the block data taking statistical characteristics of the quantization coefficients into consideration, thereby transmitting Compressed data ($V_{CD}$). A variable-length-coding procedure with respect to the video data will be described hereinafter. The buffer 14 is input with a compression data from the variable length coder 13 and outputs the data to a transmission channel at a constant speed. Then, the quantization level (Q) is output for controlling the quantity of input data, so as to prevent an overflow or an underflow in transmission data.

Generally, there are similar patterns between adjacent frames in the video data. Accordingly, in case of slight movement of an image, the motion of the image is estimated by comparing a present frame with previous frames. A motion vector (MV) is calculated as a result of the motion estimation. A motion compensation is achieved from previous frames with a motion vector. The quantity of differential data between block data obtained from motion compensation and block data input to the input terminal 10 is very small, so that the data can be further compressed in the above coding process. A feedback loop for performing the motion estimation and motion compensation includes a dequantizer 15, an inverse orthogonal-transformer 16, a frame memory 17, a motion estimator 18 and a motion compensator 19. The dequantizer 15 and inverse orthogonal-transformer 16 dequantizes and inversely discrete-cosine-transforms the quantization coefficients output from the quantizer 12, and transforms them into video data in the spatial domain. A second adder A2 adds the video data output from the inverse orthogonal-transformer 16 to the feedback data input via a second switch SW2, thereby outputting a resultant block data. The block data output from the second adder A2 is sequentially stored in the frame memory 17, thereby reconstructing a frame. A motion estimator 18 catches the block data, which is the most similar data in pattern with the block data input via the input terminal 10, from the frame data stored in the frame memory 17, and calculates the motion vector MV for estimating the motion of images from the two block data. The motion vector MV is transmitted to a receiver and the motion compensator 19, in order to be used in a decoding system. The motion compensator 19 reads out the block data corresponding to the motion vector MV from the frame data in the frame memory 17, and inputs the read data to the first adder A1. As described above, the first adder A1 calculates a differential data between the block data input from the input terminal 10 and the block data input from the motion compensator 19, then the differential data is coded, and the coded data is transmitted to the receiver. Moreover, the two switches SW1 and SW2 in FIG. 1 are refresh switches for refreshing the data in the unit of a frame or block of a predetermined size, in order to prevent the difference between coded data of frames and unprocessed data of frames due to the accumulation of the differential data. The coded video data ($V_{CD}$) is transmitted to the receiver and input to a decoder such as is shown in FIG. 2. A variable length decoder 21 decodes the input video data ($V_{CD}$) via an inverse process of variable-length-coding. A dequantizer 22 decodes quantization coefficients input from the variable length decoder 21, thereby outputting transformation coefficients in the frequency domain. An inverse orthogonal-transformer 23 transforms the transformation coefficients in the frequency domain, which are input from the quantizer 22, into the video data in the spatial domain. The motion vector MV output from the motion estimator 18 of the coder is input to a motion compensator 24 of the decoder. The motion compensator 24 reads out the block data corresponding to the motion vector MV from the frame data stored in a frame memory 24, and inputs the read data to an adder A. The adder A adds the differential data output from the inverse orthogonal-transformer 23 to the block data input from the motion compensator 24, thereby outputting resultant reconstructed block data. A switch SW connected to an output terminal of the motion compensator 24 plays the same role with the refresh switches as the above described coder in FIG. 1.

There has been used a Huffman Code for variable-length-coding in a conventional coding system. Huffman Coding allocates different codes in length according to a probability of a predetermined symbol in the input data. That is, the higher the probability is, the shorter a code is allocated, and the lower the probability is, the longer a code is allocated. In coding by means of Huffman algorithm, in the case where there are multiforms of symbols in abundance, and numbers of symbols have low probabilities, when long codes are allocated for a plurality of rare symbols by the Huffman algorithm, data-processing comes to be further complicated in the process of coding and decoding. In order to solve these problems, in the case that a code with a predetermined fixed length is allocated for a distribution area of a plurality of rare symbols (which is hereinafter assumed as an escape area), the complexity of the data-processing is greatly reduced, even if an average code length can be increased more than an average value of original Huffman codes.

FIG. 3A shows a two-dimensional 8×8 block of data, FIG. 3B shows a two-dimensional 8×8 block of quantization coefficients which transform the block data into data in the frequency domain and quantize the transformed data, and FIG. 3C shows the zigzag scan of the quantization coefficients from low frequency to high frequency, and codes the scanned coefficients into [run-level] symbols, considering that most quantization coefficients are "0" in the low frequency domain. The run means the number of 0's being between coefficients not "0", the level represent absolute values of coefficients not "0". In the case of the 8×8 data of FIGS. 3A–3C, the run can have values from "0" to "63". In the case that the quantization output is an integer value from "–255" to "255" the level is a value from "1" to "255" and the sign is separately indicated.

FIG. 4 shows an escape area and a regular area classified according to probabilities of [run level] symbols. A probability of symbols with a large value of run and/or level in [run level] symbols is very low statistically. A distribution area of symbols with a low probability, is allocated as an escape area, in which the symbols are represented by an escape sequence of fixed length, and a regular Huffman code is allocated for the other area (regular area). For example, in the case of 8×8 block data, the escape sequence consists of 6-bit escape symbols, 6-bit runs for representing from "0" to "63", 8-bit levels for showing from "1" to "255" and a sign bit of 1-bit. Accordingly, the escape sequence has the fixed length of 21 bits.

A conventional variable-length-coding system has utilized a zigzag scanning pattern (described in FIGS. 3A–3C) for N×N quantization coefficients in variable-length-coding the video data, because energies of the video signal are concentrated at the low frequency domain centering around DC components. However, the energy of the video signal can be more widely distributed to frequency components of a horizontal orientation or a vertical orientation according to the pattern of the video signal. Therefore, a conventional zigzag scanning pattern is not an optimized scanning pattern for variable-length-coding the video data. Accordingly, the scanning pattern which can be adaptably changed to a horizontal orientation or a vertical orientation according to the distribution characteristics of the video data, are desirable for variable-length-coding and variable-length-decoding.

SUMMARY OF THE INVENTION

Therefore, to solve the above problems, it is one object of the present invention to provide a variable-length-coding system which adopts an optimized scanning pattern in accordance with data distribution characteristics for every block data and variable-length-codes every block data, in variable-length-coding the digital data which are partitioned into blocks of a predetermined size.

It is another object of the present invention to provide a variable-length-decoding system which variable-length-decodes a corresponding block data according to the same optimized scanning pattern as selected in the process of variable-length-coding for every block data.

The one object of the present invention, in a method for variable-length-coding the digital data which are divided into the block unit of a predetermined size, is achieved by the following steps. The method comprises the steps of scanning the block data according to various scanning patterns, and coding the scanned data to [run level] symbols in accordance with each of the scanning patterns; variable-length-coding respectively diverse [run level] symbols coded according to the various scanning patterns; accumulating separately the various lengths of data which are variable-length-coded at the variable-length-coding steps according to the various scanning patterns; selecting a scanning pattern corresponding to a minimum value among accumulated values of lengths of variable-length-coded data obtained at the accumulating steps according to the various scanning patterns; and selecting as transmission data, that data which is variable-length-coded during the variable-length-coding step according to the scanning pattern selected at the selecting step.

Another object of the present invention, in a method for variable-length-decoding the data which are variable-length-coded in a block unit of a predetermined size, is achieved by the following steps. The method comprises the steps of inputting variable-length-coded data by means of the above variable-length-coding method and scanning pattern data corresponding to the selected scanning pattern; variable-length-decoding the input variable-length-coded data; outputting a predetermined scan address corresponding to the input scanning pattern data; decoding variable-length-decoded [run level] symbols at variable-length-decoding step according to the scan address, thereby transforming the symbols into predetermined coefficients.

BRIEF DESCRIPTION OF THE DRAWINGS

The objects and features of the present invention will become more apparent from the consideration of the following detailed description taken in conjunction with the accompanying drawings in which:

FIG. 6 is a block diagram showing an embodiment of a variable length decoder in accordance with the present invention.

FIGS. 7A—7C are diagrams for explaining the scanning patterns in the apparatus of FIGS. 5 and 6.

DETAILED DESCRIPTION OF THE PREFERRED EMBODIMENT

The preferred embodiment of the present invention will be described below with reference to the accompanying drawings.

Figure 1:
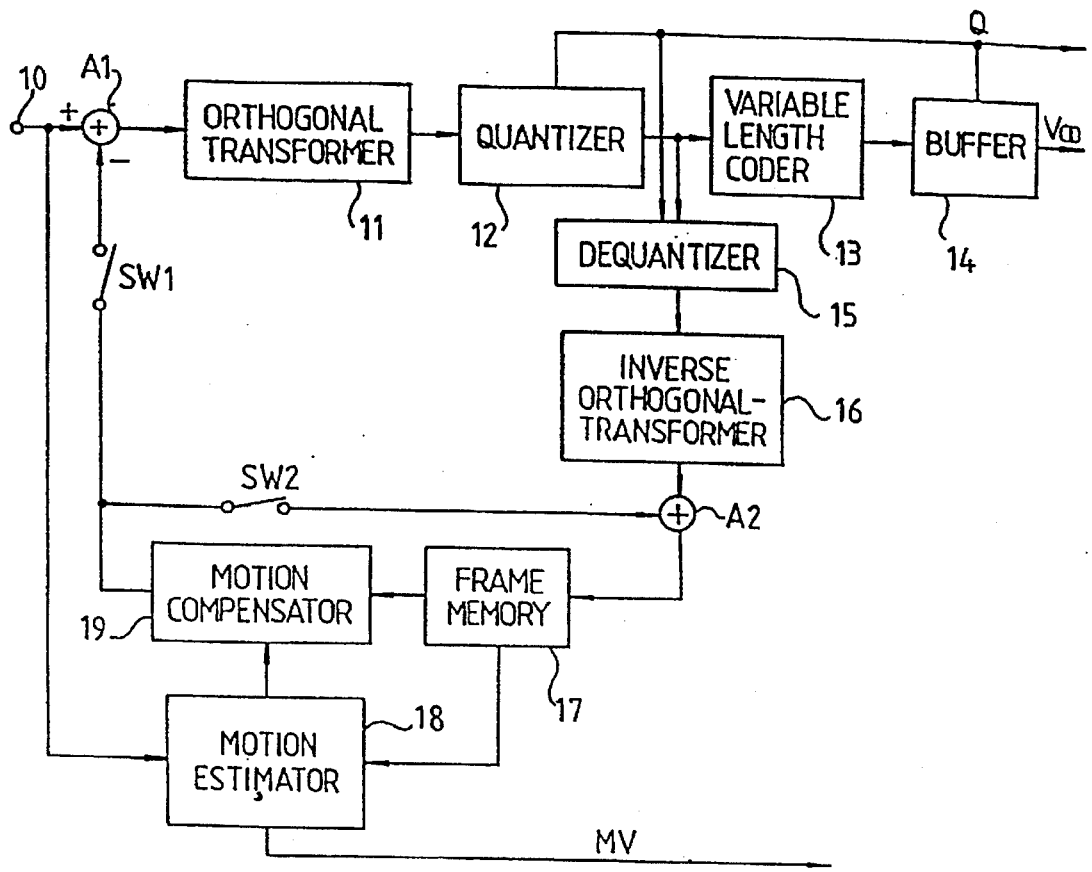
FIG. 1 is a block diagram showing an embodiment of a conventional coder.
Figure 2:
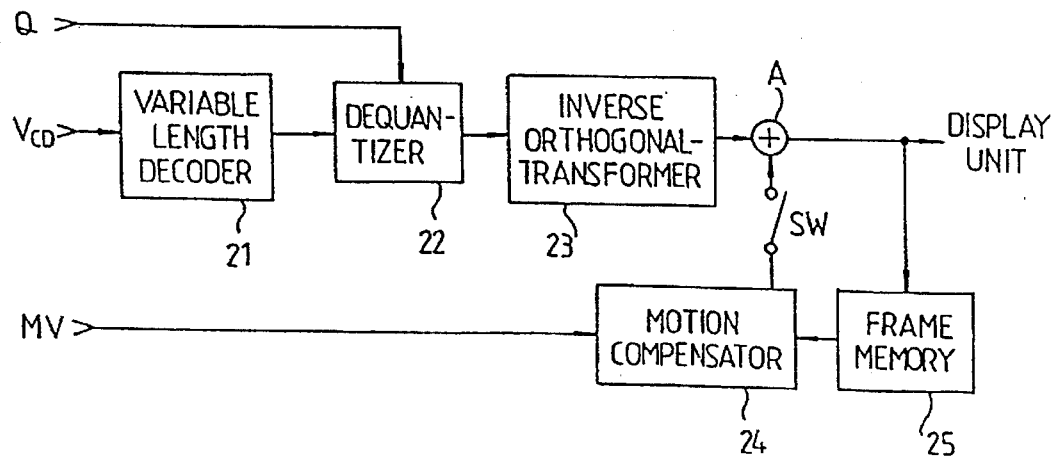
FIG. 2 is a block diagram showing an embodiment of a conventional decoder.
Figure 3A:
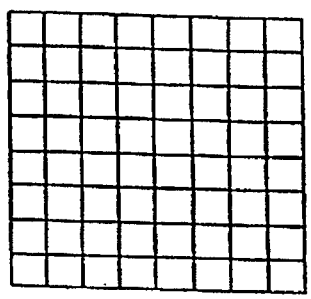
FIGS. 3A–3C are diagrams for explaining a conventional scanning pattern and a coding process.
Figure 3B:
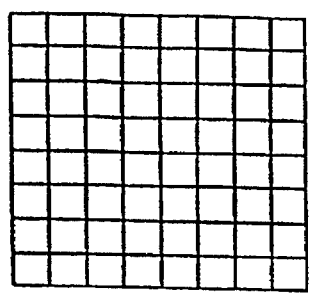
Figure 3C:
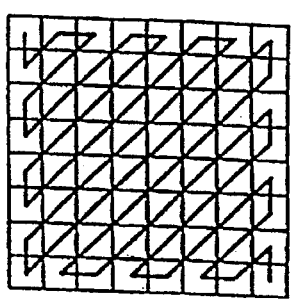
Figure 4:
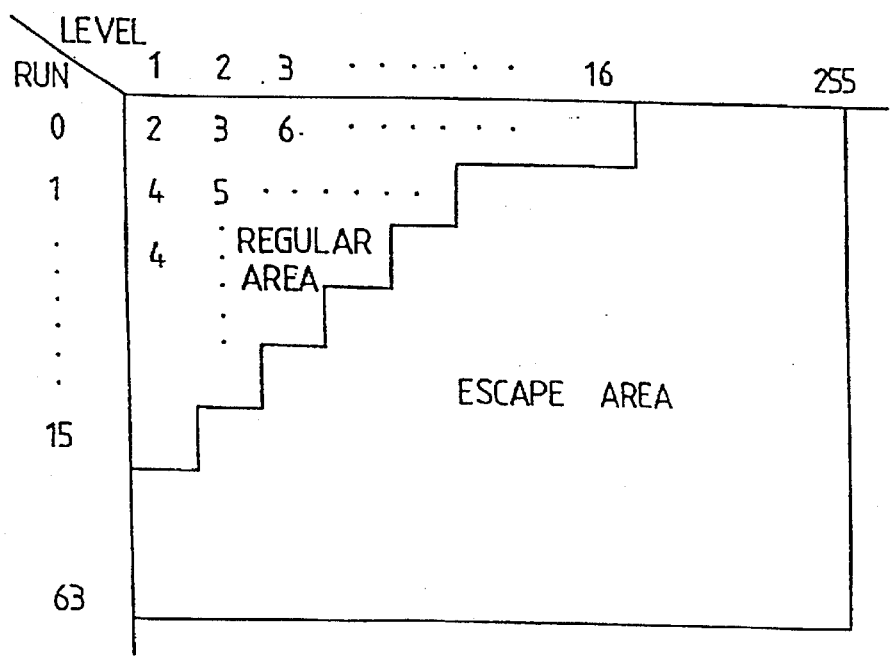
FIG. 4 is a diagram for explaining a distribution state of variable-length-coded data.
Figure 5:
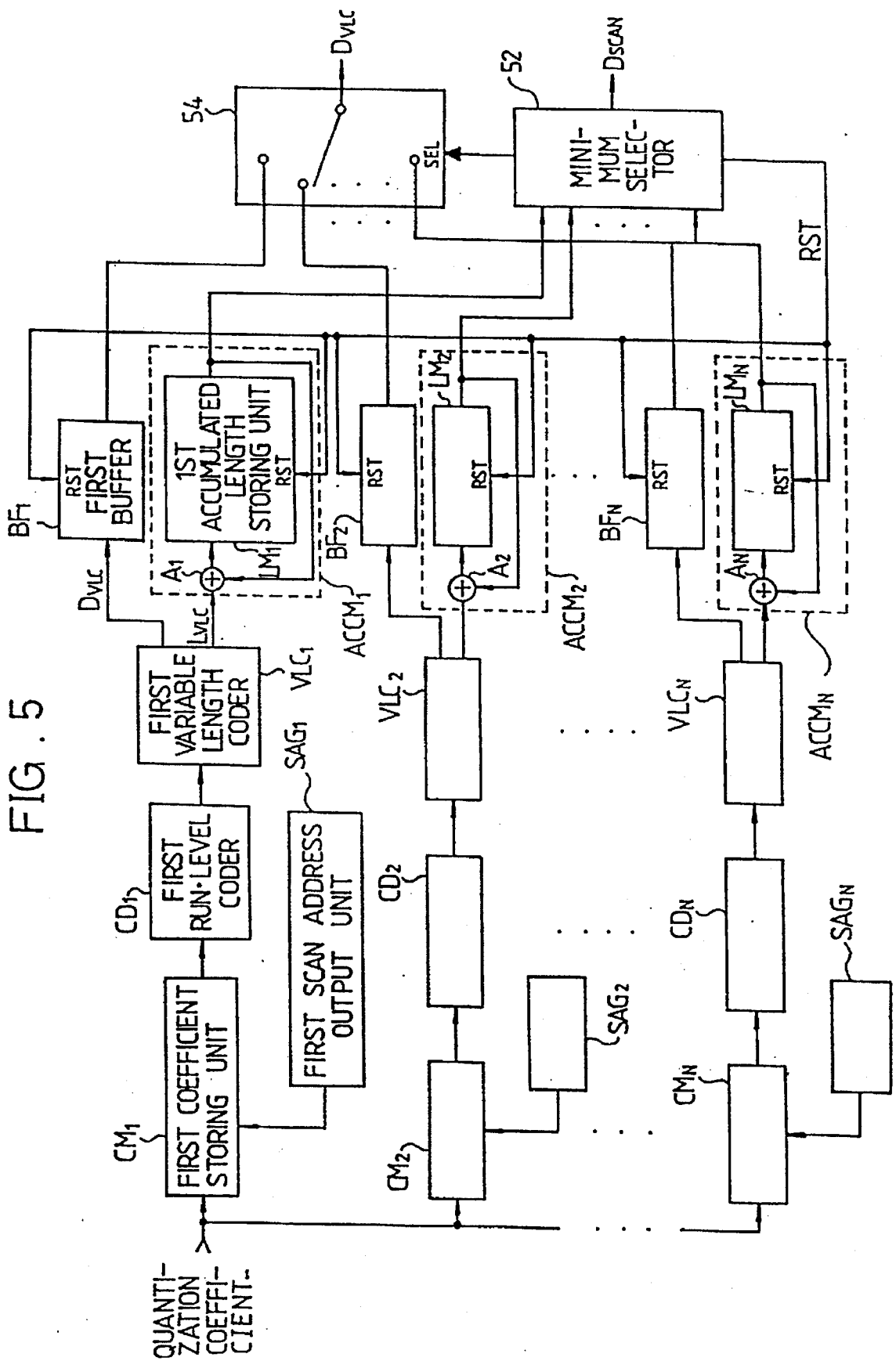
FIG. 5 is a block diagram showing an embodiment of a variable-length-coder in accordance with the present invention.

FIG. 5 shows a variable length coder in accordance with an embodiment of the present invention. The coder of FIG. 5 comprises N coefficient storing units ($CM1-CM_N$) for respectively storing the quantization coefficients of quantized block data; N scan address output units ($SAG_1-SAG_N$) for inputting different scan addresses to each of the coefficient storing units; N [run level] coders ($CD_1-CD_N$) for [run level] coding coefficients in each of the coefficient storing units according to respective scanning patterns; N variable length coders ($VLC_1-VLC_N$) for variable-length-coding [run level] symbols output from each of the [run-level] coders according to a variable-length-coding map; N buffers ($BF_1-BF_N$) for storing the variable-length-coding data of each of the variable length coders; N accumulators ($ACCM_1-ACCM_N$) for separately accumulating the lengths of variable-length coded data output from each of the variable length coders; a minimum selector 52 for selecting a minimum value among accumulated lengths in N accumulators; and a selecting switch 54 for selecting and transmitting the buffer output of variable-length coding channels selected in the minimum selector.

First, the quantization coefficients which are quantized in a block unit of a predetermined size, are stored in each of the N coefficient storing units ($CM1-CM_N$). The first, second, and N coefficient storing units are respectively input the first, second, and N scan addresses which are separately output from the first, second, and N scan address output units. Described below is a coding channel for the first coefficient storing unit ($CM_1$) among N coefficient storing units which are scanned by each of the N scan addresses.

The quantization coefficients stored in the first coefficient storing unit ($CM_1$) are scanned toward a predetermined scanning orientation by the first scan address, and coded to a [run level] symbol in the first [run level] coder ($CD_1$). The first variable length coder ($VLC_1$) variable-length-codes the [run·level] symbol input from the first [run level] coder ($CD_1$) according to a predetermined variable-length-coding map, and respectively outputs variable-length-coded data ($D_{VLC}$) and the length of the variable-length-coded data ($L_{VLC}$). The variable-length-coded data ($D_{VLC}$) output from the first variable length coder ($VLC_1$) is stored in the first buffer ($BF_1$), and the length of the variable-length-coded data ($L_{VLC}$) is input and accumulated to the first accumulator ($ACCM_1$) which accumulates the lengths of code that are coded by the first unit ($VLC_1$). The first accumulator ($ACCM_1$) consists of an adder (A1) and an accumulated length storing unit ($LM_1$). The length of the variable-length-coded data ($L_{VLC}$) which is input from the first variable length coder ($VLC_1$) is added to accumulated lengths which are feedback from the first accumulated length storing unit ($LM_1$) in the adder (A1). The first accumulated length storing unit ($LM_1$) restores an update accumulated length output from the adder (A1). A series of such coding channels are applied to the quantization coefficients of the second, third, and N coefficient storing units ($CM_2$, $CM_3$, $CM_N$). However, patterns for scanning the quantization coefficients in a block unit which are respectively stored in N coefficient storing units, are different from each other. FIG. 7 shows an embodiment of each other's different scanning patterns. A scanning pattern of FIG. 7A has a scanning orientation of 0 degrees, FIG. 7B shows a scanning pattern having a scanning orientation of 30 degrees, and FIG. 7C is a scanning pattern having a scanning orientation of 45 degrees. In channels of variable-length-coding with various scanning patterns, N accumulators ($ACCM_1-ACCM_N$) respectively provide the accumulated length data stored in each of the accumulated length storing units, to N input terminals of the minimum selector 52 for a minimum value of accumulated lengths. Each of the output terminals of N buffers ($BF_1-BF_N$), which stores the variable-length-coded data according to N types of scanning patterns, are separately connected to N input terminals of the selecting switch 54. The minimum selector 52 selects a minimum value among the accumulated length data input from each of the N accumulated length storing units ($LM_1-LM_N$). The minimum selector 52 outputs a scanning pattern data ($D_{SCAN}$) which represents scanning patterns of variable-length-coding channels with a selected minimum value of accumulated lengths, and provides a predetermined selecting control signal (SEL) corresponding to the selected minimum value of accumulated lengths to the selecting switch 54. The selecting switch 54 selects and outputs a variable-length-coded data ($D_{VLC}$) with the minimum value of accumulated lengths among the input data which are respectively input to N input terminals.

Whenever a minimum value is selected, that is, the variable-length-coding of every block data is completed, the minimum selector 52 generates a reset signal (RST), thereby resetting the N buffers ($BF_1-BF_N$) and the N accumulated length storing units ($LM_1-LM_N$). The variable-length-coded data ($D_{VLC}$) and the scanning pattern data ($D_{SCAN}$), which are output from the variable length coder, are transmitted to the receiver and supplied to a decoder.

FIG. 6 shows an embodiment of a variable length decoder in accordance with the present invention. Referring to FIG. 6, the input variable-length-coded data ($D_{VLC}$) are input to a variable length decoder 61 are transformed to the [run level] symbol according to a variable-length-decoding map. Moreover, the scanning pattern data ($D_{SCAN}$) transmitted from the coder are input to a scanning pattern selector 62 which stores each of the scanning addresses corresponding to various scanning patterns (1, N scans). The scanning pattern selector 62 selects and outputs scan addresses ($ADDR_S$) corresponding to the input scanning pattern data ($D_{SCAN}$). A run level decoder 63 transforms the [run level] symbols input from the variable length decoder 61 into a two-dimensional array of quantization coefficients according to the scan addresses ($ADD_S$) input from the scanning pattern selector 62. Then, the quantization coefficients are provided to a dequantizer.

As described above, the variable-length-coding system in accordance with the present invention variable-length-codes every block data according to diverse scanning patterns, and then transmits both a scanning pattern which minimizes the length of variable-length-coded data and variable-length-coded data according to the scanning pattern. At that time, the variable-length-decoding system in accordance with the present invention variable-length-decodes the transmitted variable-length-coded data according to the same scanning pattern as utilized in the process of variable-length-coding. As a result, the system for variable-length-coding and variable-length-decoding can further compress the transmission data.

While the present invention has been illustrated and described in connection with two-dimensional data, the present invention can be applied to a coding and decoding system which utilizes multi-dimensional data.

What is claimed is:

1. A method of decoding data, comprising the steps of:
    transforming variable length coded data into symbol data;
    converting said symbol data into quantization coefficients by run level decoding said symbol data; and
    scanning said quantization coefficients in accordance with a specific scanning pattern selected from a plurality of scanning patterns in response to scan pattern data.

2. The method of decoding data according to claim 1, wherein the step of scanning comprises transforming said quantization coefficients into two-dimensional quantization coefficients.

3. The method of decoding data according to claim 2, wherein said two-dimensional quantization coefficients are quantization coefficients stored at memory locations based on said specific scanning pattern such that said quantization coefficients stored at said memory locations correspond to a two-dimensional array of said quantization coefficients.

4. The method of decoding data according to claim 1, further comprising the step of dequantizing said quantization coefficients after said scanning step.

5. The method of decoding data according to claim 1, wherein said scan pattern data indicates one of a plurality of scanning patterns including a zigzag scanning pattern and another scanning pattern.

6. The method of decoding data according to claim 5, wherein said another scanning pattern is an alternate scanning pattern.

7. A decoding apparatus comprising:
    a variable length decoder for transforming variable length coded data into symbol data; and
    a run level decoder for converting said symbol data into quantization coefficients and for scanning said quantization coefficients in accordance with a specific scanning pattern selected from a plurality of scanning patterns in response to scan pattern data.

8. The decoding apparatus as recited in claim 7, wherein said run level decoder transforms said quantization coefficients into two-dimensional quantization coefficients when scanning said quantization coefficients.

9. The method of decoding data according to claim 8, wherein said two-dimensional quantization coefficients are quantization coefficients stored at memory locations based on said specific scanning pattern such that said quantization coefficients stored at said memory locations correspond to a two-dimensional array of said quantization coefficients.

10. The decoding apparatus as recited in claim 7, further comprising:
    a dequantizer for dequantizing said coefficients after said coefficients are scanned.

11. The decoding apparatus as recited in claim 7, further comprising:
    a storage device for storing a plurality of scanning patterns; and
    means for outputting a scanning order in accordance with said specific scanning pattern among said plurality of scanning patterns.

12. The decoding apparatus as recited in claim 11, wherein said plurality of scanning patterns includes a zigzag scanning pattern and an alternate scanning pattern.

13. A decoding apparatus comprising:
    means for transforming variable length coded data into symbol data;
    means for converting said symbol data into quantization coefficients by run level decoding said symbol data; and
    means for scanning said quantization coefficients in accordance with a specific scanning pattern selected from a plurality of scanning patterns in response to scan pattern data.

14. The decoding apparatus as recited in claim 13, wherein said means for scanning said quantization coefficients transforms said quantization coefficients into two-dimensional quantization coefficients.

15. The method of decoding data according to claim 14, wherein said two-dimensional quantization coefficients are quantization coefficients stored at memory locations based on said specific scanning pattern such that said quantization coefficients stored at said memory locations correspond to a two-dimensional array of said quantization coefficients.

16. The decoding apparatus as recited in claim 13, further comprising:
    means for dequantizing said quantization coefficients after said quantization coefficients are scanned.

17. The decoding apparatus as recited in claim 13, further comprising:
    a storage means for storing a plurality of scanning patterns; and
    means for outputting a scanning order in accordance with said specific scanning pattern among said plurality of scanning patterns.

18. The decoding apparatus as recited in claim 17, wherein said plurality of scanning patterns includes a zigzag scanning pattern and an alternate scanning pattern.

19. A method of decoding data, comprising the steps of:
    transforming variable length coded data into symbol data by variable length decoding said data, said symbol data having a run value and a level value; and
    transforming quantization coefficients in accordance with a specific scanning pattern selected from a plurality of scanning patterns in response to scan pattern data, wherein the values of said quantization coefficients are determined in accordance with said run value and said level value of said symbol data.

20. The method of decoding data according to claim 19, wherein said transforming step is accomplished with a run level decoder.

21. The method of decoding data according to claim 19, wherein said transformed quantization coefficients are two-dimensional quantization coefficients.

22. The method of decoding data according to claim 21, wherein said two-dimensional quantization coefficients are quantization coefficients stored at memory locations based on said specific scanning pattern such that said quantization coefficients stored at said memory locations correspond to a two-dimensional array of said quantization coefficients.

23. The method of decoding data according to claim 19, further comprising the step of dequantizing said quantization coefficients after said transforming step.

24. The method of decoding data according to claim 19, wherein said scan pattern data indicates one of a plurality of scanning patterns including a zigzag scanning pattern and another scanning pattern.

25. The method of decoding data according to claim 24, wherein said another scanning pattern is an alternate scanning pattern.

26. A method of decoding data, comprising the steps of;
transforming variable length coded data into symbol data by variable length decoding said data, each of said symbol data having a run value and a level value; and
transforming quantization coefficients in accordance with a specific scanning pattern selected from a plurality of scanning patterns in response to scan pattern data;
wherein the value of each of said quantization coefficient is determined in accordance with said run value and said level of said symbol data.

27. A method of decoding data, comprising the steps of:
transforming variable length coded data into symbol data by variable length decoding said data, each of said symbol data having a run value and a level value;
determining quantization coefficients in accordance with said run value and said level value; and
transforming quantization coefficients in accordance with a specific scanning pattern selected from a plurality of scanning patterns in response to scan pattern data.

28. A decoding apparatus comprising:
a variable length decoder for transforming variable length coded data into symbol data, said symbol data having a run value and a level value; and
a transforming device for transforming quantization coefficients in accordance with a specific scanning pattern selected from a plurality of scanning patterns in response to scan pattern data, wherein the values of said quantization coefficients are determined in accordance with said run value and said level value of said symbol data.

29. The decoding apparatus as recited in claim 28, wherein said transforming device transforms said quantization coefficients into two-dimensional quantization coefficients.

30. The method of decoding data according to claim 29, wherein said two-dimensional quantization coefficients are quantization coefficients stored at memory locations based on said specific scanning pattern such that said quantization coefficients stored at said memory locations correspond to a two-dimensional array of said quantization coefficients.

31. The decoding apparatus as recited in claim 28, further comprising:
a dequantizer for dequantizing said coefficients after said coefficients are transformed.

32. The decoding apparatus as recited in claim 28, further comprising:
a storage device for storing a plurality of scanning patterns; and
means for outputting a scanning order in accordance with said specific scanning pattern among said plurality of scanning patterns.

33. The decoding apparatus as recited in claim 32, wherein said plurality of scanning patterns includes a zigzag scanning pattern and an alternate scanning pattern.

34. A decoding apparatus comprising:
means for transforming variable length coded data into symbol data, said symbol data having a run value and a level value; and
means for transforming quantization coefficients in accordance with a specific scanning pattern selected from a plurality of scanning patterns in response to scan pattern data, wherein the values of said quantization coefficients are determined in accordance with said run value and said level value of said symbol data.

35. The decoding apparatus as recited in claim 34, wherein said transformed quantization coefficients are two-dimensional quantization coefficients.

36. The method of decoding data according to claim 35, wherein said two-dimensional quantization coefficients are quantization coefficients stored at memory locations based on said specific scanning pattern such that said quantization coefficients stored at said memory locations correspond to a two-dimensional array of said quantization coefficients.

37. The decoding apparatus as recited in claim 34, further comprising:
means for dequantizing said coefficients after said coefficients are transformed.

38. The decoding apparatus as recited in claim 34, further comprising:
means for storing a plurality of scanning patterns; and
means for outputting a scanning order in accordance with said specific scanning pattern among said plurality of scanning patterns.

39. The decoding apparatus as recited in claim 38, wherein said plurality of scanning patterns includes a zigzag scanning pattern and an alternate scanning pattern.

40. A method of decoding data, comprising the steps of:
converting variable length coded data into symbol data;
transforming said symbol data into quantization coefficients by run level decoding said symbol data; and
scanning said quantization coefficients in accordance with a specific scanning pattern selected from a plurality of scanning patterns in response to scan pattern data.

41. The method of decoding data according to claim 40, wherein the step of scanning comprises transforming said quantization coefficients into two-dimensional quantization coefficients.

42. The method of decoding data according to claim 41, wherein said two-dimensional quantization coefficients are quantization coefficients stored at memory locations based on said specific scanning pattern such that said quantization coefficients stored at said memory locations correspond to a two-dimensional array of said quantization coefficients.

43. The method of decoding data according to claim 40, further comprising the step of dequantizing said quantization coefficients after said scanning step.

44. The method of decoding data according to claim 40, wherein said scan pattern data indicates one of a plurality of scanning patterns including a zigzag scanning pattern and another scanning pattern.

45. The method of decoding data according to claim 44, wherein said another scanning pattern is an alternate scanning pattern.

* * * * *